United States Patent [19]
Blomgren et al.

[11] Patent Number: 6,076,155
[45] Date of Patent: *Jun. 13, 2000

[54] SHARED REGISTER ARCHITECTURE FOR A DUAL-INSTRUCTION-SET CPU TO FACILITATE DATA EXCHANGE BETWEEN THE INSTRUCTION SETS

[75] Inventors: James S. Blomgren; David E. Richter, both of San Jose, Calif.

[73] Assignee: S3 Incorporated, Santa Clara, Calif.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/100,273

[22] Filed: Jun. 19, 1998

Related U.S. Application Data

[63] Continuation of application No. 08/547,395, Oct. 24, 1995, Pat. No. 5,805,918.
[51] Int. Cl.[7] .................................................... G06F 9/54
[52] U.S. Cl. .......................................................... 712/225
[58] Field of Search ................................... 395/566, 568, 395/310; 712/225, 227; 710/130

[56] References Cited

U.S. PATENT DOCUMENTS

| | | | |
|---|---|---|---|
| 5,226,164 | 7/1993 | Nadas et al. .............................. | 395/385 |
| 5,481,693 | 1/1996 | Blomgren et al. ....................... | 395/566 |
| 5,805,918 | 9/1998 | Blomgren et al. ....................... | 712/43 |

*Primary Examiner*—Richard L. Ellis
*Attorney, Agent, or Firm*—Fenwick & West LLP

[57] ABSTRACT

A dual-instruction set central processing unit (CPU) is capable of executing instructions from a reduced instruction set computer (RISC) instruction set and from a complex instruction set computer (CISC) instruction set. Data and address information may be to transferred from a CISC program to a RISC program running on the CPU by using shared registers. The architecturally-defined registers in the CISC instruction set are merged or folded into some of the architecturally-defined registers in the RISC architecture so that these merged registers are shared by the two instructions sets. In particular, the flags or condition code registers defined by each architecture are merged together so that CISC instructions and RISC instructions will implicitly update the same merged flags register when performing computational instructions. The RISC and CISC registers are folded together so that the CISC flags are at one end of the register while the frequently used RISC flags are at the other end, but the RISC instructions can read or write any bit in the merged register. The CISC code segment base address is stored in the RISC branch count register, while the CISC floating point instruction address is stored in the RISC branch link register. The general-purpose registers (GPR's) are also merged together, allowing a CISC program to pass data to a RISC program merely by writing one of its GPR's, switching control to the RISC program, and the RISC program reading one of its GPR's that is merged with and corresponds to the CISC GPR that was written to by the CISC program.

26 Claims, 4 Drawing Sheets

SHARED REGISTER ARCHITECTURE FOR A DUAL-INSTRUCTION-SET CPU TO FACILITATE DATA EXCHANGE BETWEEN THE INSTRUCTION SETS

RELATED APPLICATION

This application is a continuation of prior application 08/547,395, filed Oct. 24, 1995, now U.S. Pat. No. 5,805, 918.

This application is related to application for a "Dual-Instruction-Set Architecture CPU with Hidden Software Emulation Mode", filed Jan. 11, 1994, U.S. Ser. No. 08/179, 926. now U.S. Pat. No. 5,781,750, hereby incorporated by reference. This related application has a common inventor and is assigned to the same assignee as the present application.

BACKGROUND OF THE INVENTION

1. Field of the Invention

This invention relates to computing hardware, and more particularly to the architecture of registers in a processor capable of executing from two instruction sets.

2. Description of the Related Art

Processors, or central processing units (CPU's) that are capable of executing instructions from two separate instruction sets are highly desired at the present time. For example, a desirable processor would execute user applications for the x86 instruction set and the PowerPC™ instruction set. It would be able to execute the tremendous software base of x86 programs that run under the DOS™ and WINDOWS™ operating systems from Microsoft of Redmond, Wash., and it could run future applications for PowerPC™ processors developed by IBM, Apple, and Motorola. Such a processor is described in the related to the copending application for a "Dual-Instruction-Set Architecture CPU with Hidden Software Emulation Mode", filed Jan. 11, 1994, U.S. Ser. No. 08/179,926, now U.S. Pat. No. 5,781,750. That dual-instruction-set CPU has a pipeline which is capable of executing instructions from either a complex instruction set computer (CISC) instruction set, such as the x86 instruction set, or from a reduced instruction set computer (RISC) instruction set, such as the PowerPC™ instruction set.

Two instruction decode units are provided so that instructions from either instruction to set may be decoded. Two instruction decoders are required when the instruction sets are separate because the instruction sets each have an independent encoding of operations to opcodes. For example, both instruction sets have an ADD operation or instruction. However, the binary opcode number which encodes the ADD operation is different for the two instruction sets. In fact, the size and location of the opcode field in the instruction word is also different for the two instruction sets. In the x86 CISC instruction set, the opcode 03 hex is the ADD r,v operation or instruction for a long operand. This same opcode, 03 hex, corresponds to a completely different instruction in the PowerPC™ RISC instruction set. In CISC the 03 hex opcode is an addition operation, while in RISC the 03 hex opcode is TWI—trap word immediate, a control transfer instruction. Thus two separate decode blocks are necessary for the two separate instruction sets.

Programs may run in either or both instruction sets. Data and other information may be shared between RISC programs and CISC programs. One way to share data and other information is to store the data in a register within the CPU before switching to the alternate instruction set, and making all registers readable by either instruction set. Unfortunately, this requires that the instruction sets be extended to provide instructions to read the additional registers. The shared data could also be saved to a stack in memory, but this decreases performance due to the time required to transfer the data to memory and to adjust the stack pointers.

Two sets of registers could be provided; one set for the use of CISC programs and a second set for the use of RISC programs. This is an expensive approach since the registers reside on the CPU die, which has a limited space available for registers. The additional registers would require increasing the size of the CPU die, or deleting another function such as floating point processing.

What is desired is a way to share some of the registers between a CISC and a RISC architecture on a dual-instruction-set CPU. It is further desired lo have shared registers for data and system information. The shared registers should not be extra registers in addition to the registers already defined by the CISC or RISC architectures, but should be registers already existing in the architectures. The shared registers must not cause conflicts between use in the two instruction sets or other undesirable effects.

SUMMARY OF THE INVENTION

Certain CPU registers defined by a RISC and a CISC architecture are shared. CISC and RISC programs may alter and read these shared registers, allowing data and system information to be exchanged between programs running in the two instruction sets.

A shared register system for a dual-instruction-set processor has a shared register for storing information to be transferred between a first program comprised of instructions from a first instruction set and a second program comprised of instructions from a second instruction set. The first instruction set has a first encoding of operations to opcodes, while the second instruction set has a second encoding of operations to opcodes. The first encoding of operations to opcodes is substantially independent from the second encoding of operations to opcodes.

A first means is for accessing the shared register from the first instruction set. The first means writes information into the shared register responsive to a first subset of instructions from the first instruction set. A second means is for accessing the shared register from the second instruction set. The second means reads information from the shared register responsive to a second subset of instructions from the second instruction set and.

The invention allows information to be transferred from the first program to the second program using the shared register. In other aspects of the invention, the shared register may be any one of the general-purpose registers accessible to both instruction sets, while the source and destination fields in the instruction words specify which general-purpose register to access. In still further aspects of the invention, the shared register is the flags register which stores flags or condition codes that are implicitly written by arithmetic-logic-unit (ALU) operations. Although the shared flags register contains a first flags field for flags from the first instruction set and a second flags field for the flags from the second instruction set, either instruction set can access the flags in the shared register regardless of which instruction set the flags are from.

DETAILED DESCRIPTION

The present invention relates to an improvement in processor architecture. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

This application is related to the copending application for a "Dual-Instruction-Set Architecture CPU with Hidden Software Emulation Mode", filed Jan. 11, 1994, U.S. Ser. No. 08/179,926, now U.S. Pat. No. 5,781,750, hereby incorporated by reference.

A dual-architecture central processing unit (CPU) is capable of operating in three modes—RISC mode, CISC mode, and emulation mode. A first instruction decoder decodes instructions when the processor is in RISC mode, while a second instruction decoder decodes instructions while the processor is in CISC mode. Two instruction decoders are needed since the RISC and CISC instruction sets have an independent encoding of instructions or operations to binary opcodes.

The third mode of operation, emulation mode, also uses the first instruction decoder for RISC instructions, but emulation mode executes a superset of the RISC instruction set. Using emulation mode, individual CISC instructions may be emulated with RISC instructions. Thus, not all CISC instructions need to be directly supported in the CPU's hardware. Unsupported CISC instructions cause a jump to an emulation mode routine to emulate the unsupported CISC instruction. Upon completion of the emulation mode routine, control is returned to the CISC program with the next CISC instruction.

RISC Instructions Need Access to CISC Registers

Emulation of CISC instructions with RISC instructions creates a need for the RISC instructions to have access to CISC registers. For example, a CISC branch instruction may be emulated by an emulation routine of RISC instructions. The CISC branch instruction may be a conditional branch that only branches if a certain bit in a condition code register is set, perhaps by a previous CISC instruction. Since the CISC condition code register is part of the CISC architecture, but not the RISC architecture, the condition code register would not be visible to the RISC instructions in the emulation routine. However, the RISC emulation routine must have access to this CISC condition code register to determine if the branch should be taken.

RISC Register Set

Figure 1:
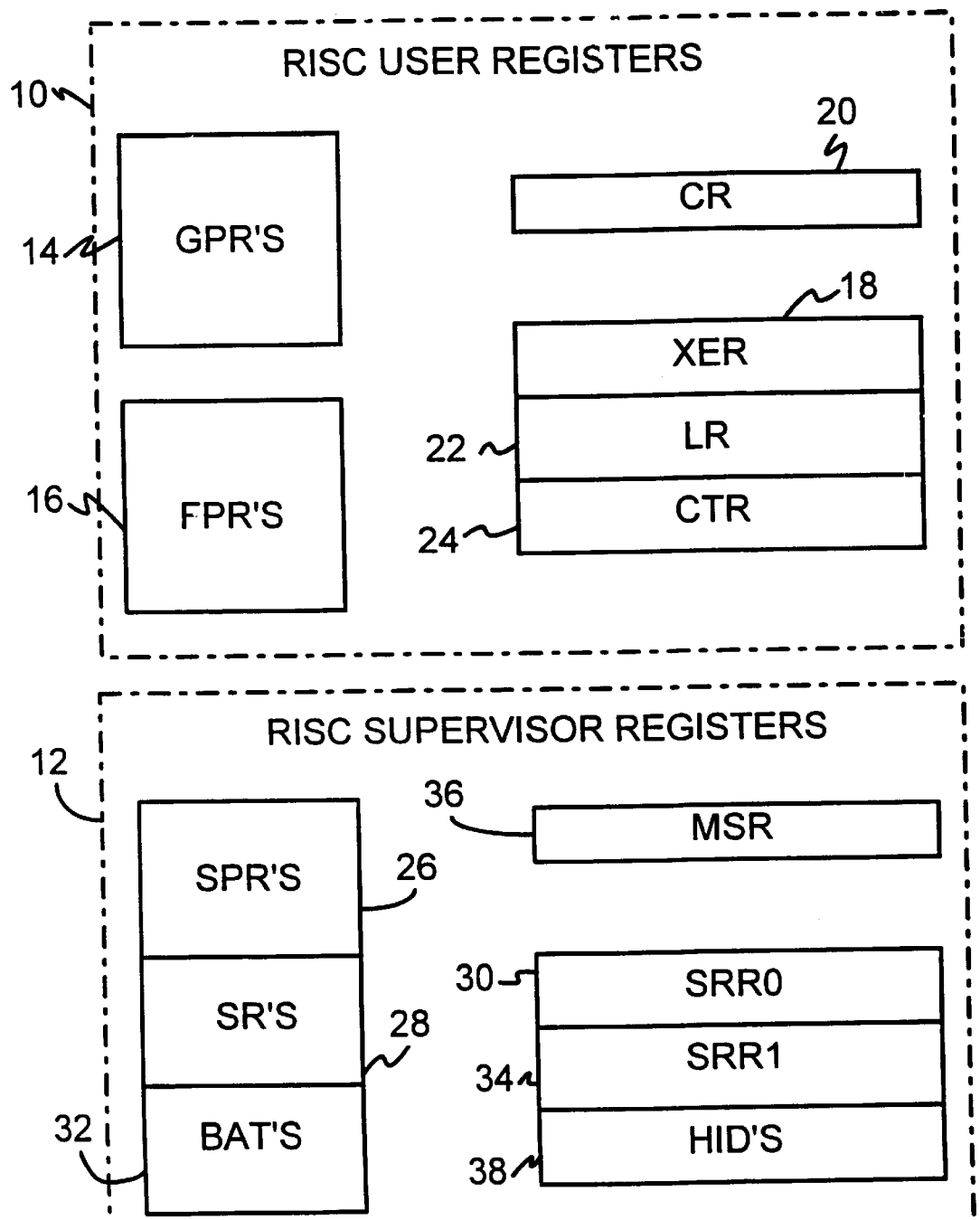
FIG. 1 is a diagram of a RISC register set.

FIG. 1 is a diagram of a register set for a RISC architecture such as the PowerPC™. Registers that are visible to a user program are shown as user register space 10. Supervisory programs such as operating systems are able to see all of the registers in the user register space 10 and the registers in the supervisor's register space 12. The user registers include general-purpose registers 14 which are used by programs for temporary storage of operands and results, and for address formation. Floating point registers 16 are provided for storing floating point numbers that a numeric processor operates on. Condition register 20 contains condition codes set by various instructions and is useful for setting and checking conditions for conditional branch instructions. Integer exception register 18 contains bits that are set when an exception is caused by execution of an instruction. It contains information on overflows and carries that occurred in an arithmetic-logic-unit (ALU) when the instruction causing the exception was executed. Link register 22 contains the branch target address when a special branch to link register instruction is executed. Count register 24 holds a value for a loop count which can be decremented, providing a simple way of programming loops.

A supervisory program such as an operating system has access to additional registers in the supervisor's register space 12. Supervisor general-purpose registers 26 are for general use by the supervisory program. Segment registers 28 and block-address translation registers 32 are for address translation functions. Machine state register 36 defines the state of the processor, including reset, and CISC/RISC/emulation mode. Machine state register 36 contains a privlege-level bit, the PR bit, to indicate if a the processor is running in user or supervisor mode when RISC min de is active. An additional bit, the xE bit, is included in machine state register 36 to indicate CISC and emulation modes. The xE bit and the PR bit are encoded as shown in Table 1.

TABLE 1

| Machine Status | | |
|---|---|---|
| xE bit | PR bit | Processor Mode |
| 0 | 0 | RISC Supervisor |
| 0 | 1 | RISC User |
| 1 | 0 | x86 Emulation |
| 1 | 1 | x86 CISC |

Machine status save restore 0 register 30 saves the effective address of the instruction following the instruction causing an exception or a system call instruction. Machine status save restore 1 register 34 saves part of machine state register 36 and other information on the cause of an exception when an exception occurs. In particular, machine status save restore 1 register 34 receives the PR bit and xE bit from the machine state register 36. Machine status save restore 1 register 34 thus saves the mode the processor was in at the time of an exception or other event, and is used to restore the processor to that mode when exception processing is complete. A return from interrupt (rfi) instruction at the completion of the exception processing will restore the xE and PR bits to the machine status register 36 from machine status save restore 1 register 34. Together, machine status save restore registers 30, 34 save the state of the processor when an exception occurs, allowing the system to return to the user program once the exception handler routine is completed. Hardware-specific registers 38 contain miscellaneous implementation-specific information such as extended features.

CISC Register Set

Figure 2:
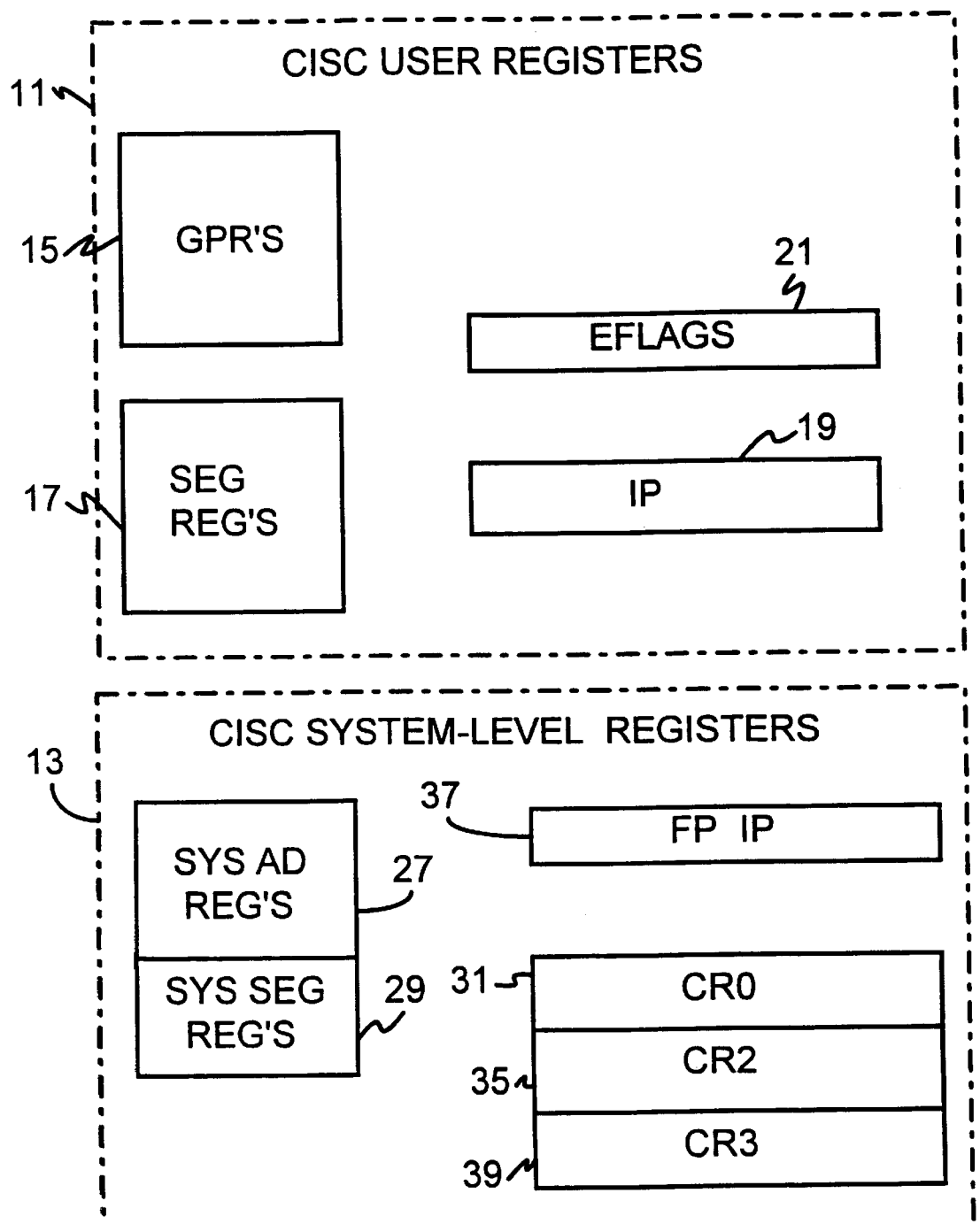
FIG. 2 is a diagram of a CISC register set.

FIG. 2 is a diagram of a register set for a CISC architecture such as the x86 used in microprocessors by Intel corporation of Santa Clara, Calif., Advanced Micro Devices of Sunnyvale, Calif., and Cyrix Corporation of Richardson, Tex. Registers that are visible to a user program are shown as user register space 11. Supervisory or system-level programs such as operating systems are able to see all of the registers in the user register space 11 and the registers in the system-level register space 13. The user registers include general-purpose registers 15 which are used by programs for temporary storage of operands and results, and for address formation. Segment registers 17 are provided for address translation. Floating point registers (not shown) may be included in some embodiments to store data in a floating-point format. Flags register 21 contains flags or condition codes set by various instructions and is used for setting and checking conditions for conditional branch instructions. Instruction pointer 19 contains the address of the instruction currently being executed.

A system-level program such as an operating system has access to additional registers in the system-level register space 13. System address registers 26 are for use by system-level programs for address generation. System segment registers 29 are for segment address translation functions. Control registers 31, 35, 39 define the state of the processor, including protected or real modes, exception handling, cache enabling, and contain the base address of page tables. Breakpoints and control, performance monitoring, real-time clocks and other control may also be included in control registers 31, 35, 39. Floating point instruction pointer register 38 contains the address of the instruction last executed by the floating point unit. It must be saved because a floating point exception may be signaled after other instructions pass through the integer pipeline. It allows an exception handler routine to find the exact address causing a floating point exception.

Condition Code/Flags Register

Condition codes are employed by both RISC and CISC instruction sets. Instructions that use the arithmetic-logic-unit (ALU) may produce a result having a zero or negative value. These instructions cause a flag or condition code in register 21 or 20 to be set when the result is zero or negative. Iterative loops may be programmed using such flags. For example, a simple loop may execute a series of instructions and decrement a loop variable each time the series of instructions in the loop is executed. The loop variable is initially set to the number of times to execute the loop. At the end of the loop, an ALU instruction subtracts one from the loop variable. When the loop variable becomes zero, the zero flag will be set. A conditional branch instruction will check the zero flag and exit the loop when zero is reached.

Many other flags may be defined. For example, the x86 CISC EFLAGS register defines the flags of Table 2 that are set or cleared by ALU instructions depending on the result of the instruction.

TABLE 2

| CF | Carry Flag | Set if carry-out or borrow |
| PF | Parity Flag | Set if low 8 bits have even parity |
| AF | Auxiliary (2nd) Carry | Bit 3 carry-out, used for BCD |
| ZF | Zero Flag | Set if all bits are zero |
| SF | Sign Flag | Set if highest-order bit is |
| DF | Direction Flag | Incr. or Decr. string variable |
| OF | Overflow Flag | Signed overflow to highest bit |

Other bits in the x86 EFLAGS register are not flag bits set by operations but are control bits that define how the processor will operate. Table 3 shows these control bits.

TABLE 3

| TF | Trap Flag | Trap after next instruction |
| IF | Interrupt enabled Flag | Enables external interrupts |
| IOPL | Input/Output Privilege level (2 bits) | Max. Privilege for I/O instr. |

TABLE 3-continued

| NT | Nested Task Flag | Nested task being executed |
| RP | Resume Flag | Resume after breakpoint |
| VM | Virtual Mode | Virtual 8086 mode executing |
| AC | Memory Alignment Check | Mis-aligned data will fault |

The dual-instruction set processor directly executes only the simpler CISC instructions. Many of these simpler CISC instructions set or clear the flag bits in Table 2. However, the control bits in Table 3 are set or cleared by complex or infrequently used CISC instructions such as privileged instructions. These instructions are therefore emulated. Only the simple CISC instructions will modify the flag bits in the CISC EFLAGS register. Emulated instructions will modify the control bits in the CISC EFLAGS register.

Figure 3:
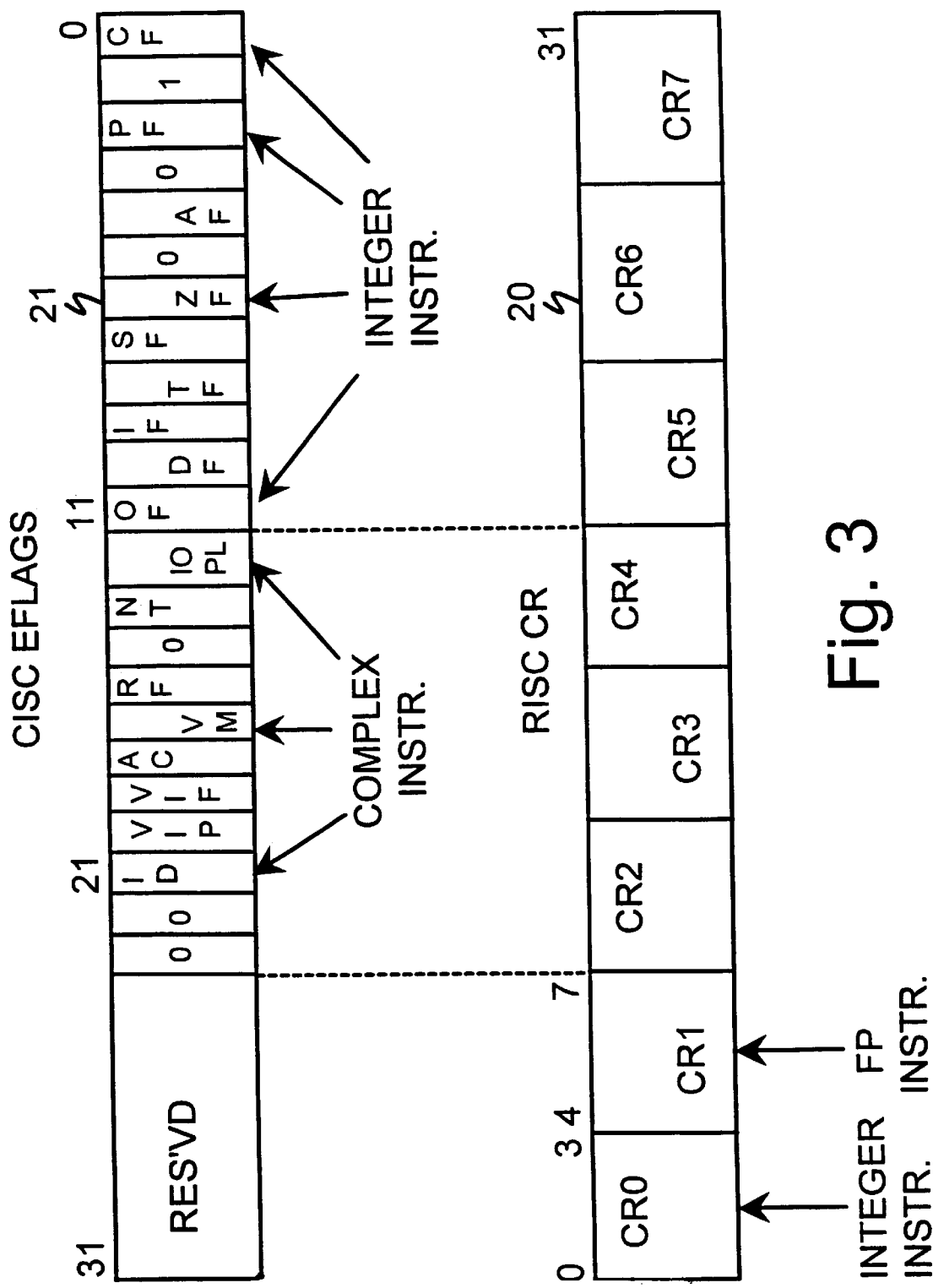
FIG. 3 is a diagram of a CISC condition flag register and a RISC condition register.

FIG. 3 shows the CISC flags register 21 and the RISC Condition register 20. In the PowerPC™ RISC architecture, flags or condition codes are kept in the condition register (CR) 20. Condition register 20 is a 32-bit register divided into eight 4-bit fields, CR0 to CR7. Most RISC integer instructions generate the four bits in CR0, but do not modify any bits in fields CR1 to CR7. Table 4 shows the meanings of the four bits in CR0.

TABLE 4

RISC CR0 field

| CR0 bit | Name | Description |
| --- | --- | --- |
| 0 | Negative | Result is negative |
| 1 | Positive | Result is positive and not zero |
| 2 | Zero | Result is Zero |
| 3 | Overflow | Overflow has occurred |

Floating point operations do not modify the bits in the CR0 field, but they do modify the four bits in the CR1 field. Table 5 shows the definitions of the four bits in CR1 set by floating point operations.

TABLE 5

RISC CR1 field

| CR1 bit | Name | Description |
| --- | --- | --- |
| 0 | FP exception | Floating point exception has occurred |
| 1 | FP enabled exception | A floating point enabled exception has occurred |
| 2 | FP invalid exception | An invalid floating point exception has occurred |
| 3 | FP Overflow | Floating Point Overflow has occurred |

A RISC compare instruction can set bits in any of the 4-bit fields CR0–CR7. Table 6 shows the definitions for the four bits in any field CRn set by the RISC compare instruction.

TABLE 6

RISC CRn field set by Compare Instruction

| CRn bit | Name | Description |
| --- | --- | --- |
| 0 | Less Than | register A is less than register B or immediate value from instruction word |
| 1 | Greater Than | register A is greater than register B or immediate value from instruction word |

TABLE 6-continued

RISC CRn field set by Compare Instruction

| CRn bit | Name | Description |
|---|---|---|
| 2 | Equal To | register A is equal to register B or immediate value from instruction word |
| 3 | Overflow | Copy of the Overflow bit in XER register |

The compare instruction specifies which field to write its result to. Likewise, the RISC branch instructions can specify, as a condition for branching, any bit in any of the fields CR0 to CR7. Thus the programmer may write condition codes to the other six fields in the CR register 20. The programmer may later use these other fields with the branch instruction using any of the bits in any of the fields CR0 to CR7. RISC move instructions may also load bits into any of the fields CR0 to CR7 of the CR register 20. The RISC move instruction may move bits from another register, or from one 4-bit CR field to another field within CR register 20. A mask may be specified in the move instruction word to indicate which bits to move and which bits to not modify. A wealth of RISC logical instructions are provided that specify as inputs one or two bits in any of the 4-bit fields. A Boolean logical function is performed on the specified input bits, and the resulting output bit is written to any bit in any of the 4-bit fields in CR register 20. Thus RISC provides a variety of instructions to update, modify, and perform logical functions on parts of the CR register 20.

CISC and RISC Flags Registers may be Combined

Although fields CR2 to CR7 may be updated in a variety of ways by RISC instructions, the inventors have recognized that fields CR2 to CR7 may be infrequently updated while fields CR0 and CR1 are typically updated frequently. A programmer has to explicitly decide to update fields CR2 to CR7, while fields CR0 ind CR1 are implicitly updated by many RISC instructions. The inventors have also recognized that most CISC instructions update bits 0 to 11 in the CISC EFLAGS register, while few CISC instructions update bits 12 to 31 in the CISC EFLAGS register. FIG. 3 compares the CISC flags register 21 and the RISC Condition register (CR) 20. FIG. 3 shows that simple CISC integer instructions update flags in bit-positions 0 to 11 of CISC EFLAGS register 31, while RISC integer instructions update bits in the 4-bit CR0 field. RISC floating point instructions update field CR1, while few RISC instructions update fields CR2 to CR7. If a RISC programmer can avoid using fields CR5 to CR7 in RISC CR register 20, which correspond to bit-positions 11 to 0 in the CISC EFLAGS register 21, then the CISC EFLAGS register 21 can be folded into or combined with the RISC CR register 20. Since the RISC programs that will share data with CISC programs are typically RISC emulation routines, the RISC programmer will be aware of these limitations and avoid using fields CR5 to CR7. Standard RISC user programs that do not avoid using fields CR5 to CR7 will not be able to take advantage of the data sharing features of the invention, but will still be able to take advantage of the cost savings of the invention because fewer registers are needed on the microprocessor. However, x86 CISC emulation routines written in RISC code will greatly benefit by both sharing data using the shared registers and by cost savings.

Complex CISC instructions modify the control bits of Table 3, which are in bit-positions 12 to 21 of EFLAGS register 21. These complex CISC instructions may be emulated with RISC instructions in the emulation mode of the dual-instruction-set processor. These control bits may be stored in memory rather than in EFLAGS register 21, freeing up these bits for use by CR2 to CR4. If CISC instructions need to read any of these control bits, then they may be stored in bit positions 12 to 21 of the EFLAGS register 21, but still updated by emulation.

Emulation of CISC Enhanced by Combined Flags Register

The CISC EFLAGS register 21 and the RISC CR register 20 are combined into a single 32-bit register in the dual-instruction-set processor. When a complex CISC instruction that updates a control bit in the EFLAGS register 21 is emulated, the RISC instructions in the emulation routine merely have to update the corresponding bit in one of the fields CR2 to CR4 in the RISC CR register 20, because the RISC CR register 20 and the CISC EFLAGS register 21 are the same shared register. For example, a complex CISC instruction writes a one to the Virtual 8086 mode bit (VM) at bit-position 17 in the EFLAGS register 21. This complex CISC instruction is not supported by the instruction decoder and signals an unsupported opcode exception, which causes emulation mode to be entered from CISC mode. An emulation routine of RISC instructions is executed to emulate the complex CISC instruction. This emulation routine contains a RISC Boolean instruction which will set bit 2 in CR3, corresponding to bit-position 17, the VM bit, in the EFLAGS register 21. The RISC Boolean instruction setting this bit may be a CR-register Boolean XOR instruction (creqv) that exclusive-OR's bit 2 to itself, with field CR3 as its sources and destination. Once the emulation routine is completed, CISC mode is again entered and execution of the CISC program resumes at the following CISC instruction. Because CISC EFLAGS register 21 and RISC CR register 20 are implemented as the same hardware register on the CPU die, updating the RISC register also updates the register seen by CISC programs. The emulation routine of RISC instructions, or other native RISC programs, may freely update bits in fields CR0 and CR1, because these bits correspond to reserved bits in CISC EFLAGS register 21. At the conclusion of the emulation routine, before CISC mode is entered, these bits in CR0 and CR1 are cleared so that they will all be read as zero when CISC mode instructions read CISC EFLAGS register 21.

Benefits and Uses of Merged Flags Registers

Folding CISC EFLAGS register 21 and RISC CR register 20 together brings additional benefits besides cost reduction by having fewer registers on the CPU die. RISC programs can examine the flag bits in CISC EFLAGS register 21 to determine the results generated by the CISC program using the existing RISC instructions. No special instructions are needed to examine this information from the other instruction set. The RISC program may examine the zero flag to determine if the CISC program had a zero result, which might indicate the end of an iterative loop. The CISC zero flag (ZF) at bit position 6 may be examined by a RISC instruction simply by reading bit 2 of field CR6. Likewise, any of the other flag bits may be examined by a RISC program by reading the corresponding bit in the RISC CR register 20. Particularly with emulation routines, having this information is critical. Because the RISC instruction set has so many instructions which can access RISC CR register 20 directly, the emulation routine may be efficiently programmed without many move or load/store instructions to make available the CISC EFLAGS register 21. Thus the emulation routine will have a much higher performance than if the CISC EFLAGS register 21 had to be stored on a stack in memory and retrieved for the emulation routine to examine. Even moving a separate CISC EFLAGS register 21 from one CPU register into the RISC CR register 20 for use by RISC branch instructions would require extra RISC instructions, decreasing performance relative to the invention.

The emulation routine can perform branches directly off the CISC flag bits. A RISC instruction in the emulation routine can branch off the VM bit in the CISC EFLAGS register by merely specifying the corresponding bit in the RISC CR register. The CR register is the most visible and accessible state register in the PowerPC™ RISC architecture. The EFLAGS register in the x86 CISC architecture is likewise the most interesting CISC register because of the many state flags stored in it. Using the RISC CR register as a window into the CISC architecture provides a versatile and powerful tool.

The RISC and CISC condition code and flags registers are effectively merged together into a single flags register that is accessible by instructions from both instruction sets. The merged register is special because it is not just explicitly accessible as a register, but the merged register is also accessible implicitly. Instructions that implicitly update the flags register, whether RISC or CISC instructions, will update the same merged register. Because the two instruction sets tend to use separate portions of the merged register, each instruction set can use its portion of the merged register, without interfering with the other instruction set. Yet programs running in one instruction set can still observe the flags set by programs in the other instruction set. Thus information about the results generated by one instruction set may be made available to programs in the other instruction set.

Information about the operating state of the x86 CISC program is also available by reading the merged flags register since control bits are stored in bit-positions 11 to 21. These control bits, shown in Table 3, include virtual 8086 mode, interrupt enabling and privilege levels, an indication of task nesting, debug trapping, and data alignment checking. Again, a RISC program merely has to read the proper bit in the merged register, which appears as the standard RISC CR register to the RISC program. Often the register does not even have to be explicitly read by the RISC program, but only implicitly read. A RISC conditional branch instruction can be set to branch on the bit in CR 5 corresponding to the CISC interrupt enable control bit (IF). A RISC program could branch to a routine to check and disable interrupts if the IF bit is set, but continue without disabling interrupts if the bit is zero, knowing that interrupts are not possible. Thus the CISC interrupt enable bit is used to direct program flow in the RISC program merely by branching on the CISC bit. No register transfers, loads, or even explicit reads were necessary. The invention provides a very clean, simple, and efficient way to pass information between programs running in two different instruction sets.

Address Generation Registers Combined

Other registers are also be folded together or combined. The RISC count register (CTR) is a 32-bit register that contains a loop count that can be decremented when a branch instruction is executed. It can be explicitly accessed by some RISC move instructions, and can be implicitly accessed by certain RISC branch instruction which cause the CTR register to be read and decremented.

One of the CISC segment registers (17 of FIG. 2) holds the base address of the code segment. This code segment register is needed to generate addresses for fetching instructions when in CISC mode. The base address in the code segment register is also needed to calculate the targets of a branch instruction. Thus the code segment register is accessed frequently.

The RISC CTR register and the CISC code segment registers may be combined together in the dual-instruction-set processor. The combined register holds the CISC code segment base address during CISC mode. The code segment base address is left in the combined CTR/CS register when RISC mode is entered. If a RISC iterative-branch instruction is encountered that uses the count register, then the rode segment base address can be saved to memory before the RISC iterative-branch instruction begins execution. The code segment base address is restored by the emulation routine to the combined CTR/CS register before CISC mode is re-entered.

Since the CTR register is infrequently used, the code segment can remain in the combined CTR/CS register most of the time, even during RISC mode. RISC emulation routines may be programmed that do not use the CTR register, thus increasing performance of the emulation routine. Since both the CISC code segment register and the RISC count register are needed by the branching unit, merging these into the same register provides a single shared register to supply both CISC and RISC address information to the branching unit.

Return Address Registers Combined

The RISC machine status save restore 0 register (SRR0) 30 of FIG. 1 saves the effective address of the instruction following the instruction causing an exception, or the effective address of the instruction following a system call instruction. When the exception handler routine completes and a return-from-interrupt (rfi) instruction is executed, the address that was stored in SRR0 is reloaded into the instruction pointer so that program execution can continue with the next instruction. Thus the SRR0 register provides a place for the address of a RISC instruction that occurs after a RISC instruction causing an exception.

In the dual-instruction-set processor, when a CISC program causes an exception, a RISC emulation routine is called and executed. Thus the normal CISC exception handling hardware is not needed and no counterpart to the SRR0 register is necessary. The CISC CR2 register would normally hold the address of an instruction causing a page fault in a CISC-only processor. This CR2 register is not needed in the dual-instruction-set processor since page faults, like other exceptions are all handled by RISC emulation code. Other CISC exceptions would cause the instruction pointer (IP) to be pushed on the stack in memory by the exception handler. Pushing the IP to the stack is not performed in micro-code, as in prior-art x86 processors, but by the emulation routine for the dual-instruction-set processor. Any time emulation mode is entered from CISC mode, regardless of the cause, the address of the CISC instruction being executed is stored into the RISC SRR0 register. When the emulation routine completes, the processor switches back to CISC mode, the address stored in register SRR0 is re-loaded into the instruction pointer, and the next instruction in the CISC program is fetched and executed.

If emulation mode is entered to handle an exception, then SRR0 should point to the CISC instruction causing the exception, so that CISC instruction can be re-started once the exception handling is complete. If emulation mode was entered to emulate a complex CISC instruction, then SRR0 should hold the address of the instruction following the CISC instruction. When the emulation routine determines the size of the CISC instruction, the size is added to the address stored in the SRR0 register to get the address of the next CISC instruction. This addition must occur because CISC instructions can vary in size, CISC instructions being 1–15 bytes in size. Thus SRR0 will cause the CISC program to continue at the instruction following the CISC instruction being emulated, unless an exception occurs.

The RISC SRR0 register, which normally holds the address of an instruction causing an exception, is also used to hold the address of a CISC instruction following a CISC instruction that caused emulation mode to be entered because the. CISC instruction was not supported in hardware but had to be emulated. These are two parallel uses, but for two different instruction sets. The additional hardware to support both of these functions is minimal because these functions are closely related.

LR and FP Registers Combined

The RISC link register (LR) provides a branch target address for a RISC branch conditional to link instruction. It is a 32-bit register. While most RISC branch instructions do not use the link register, some do.

The CISC architecture requires that the address of a floating point instruction be saved. Since floating point operations may take several clock cycles to complete, several simple integer instructions could have completed execution by the time an exception is signaled that was caused by the floating point instruction. Storing the address of the floating point instruction allows the exception handling routine to backtrack the code and sort out the integer instructions executed. This address of the floating point instruction is stored in the FP IP register in the CISC architecture. In the dual-instruction-set processor this address is instead stored in the RISC link register.

Storing the CISC floating point instruction's address in the RISC link register may cause a problem if a RISC program contains a RISC instruction that uses the link register. If that happens, the CISC floating point instruction's address must be saved to a stack in memory or to another general-purpose register. It is believed that this will be an infrequent occurrence and therefore the cost savings of combining the registers justifies sharing these two registers. Most of the time the RISC link register will not be used, so no conflict will occur.

Since the link register is used to store the address of the RISC target, a path for an instruction address is already provided to this register. Thus the floating point instruction's address may also use this instruction path to the shared LR register.

GPR'S Combined

There are 32 general-purpose registers (GPR's) for RISC which may be explicitly read or written by RISC instructions. The x86 CISC architecture provides only 8 general-purpose registers which can be read or written by a user program. CISC also provides 6 segment registers which contain segment base addresses that are used to calculate the linear address of code, data operands, and a stack. These segment registers can only be used for segmentation, a part of address generation, and have restrictions on reading and writing them with CISC instructions. Only x86 privleged or segment-load instructions can read or write the segment registers. All of these instructions are emulated by the dual-instruction-set processor. Thus CISC-mod-e instructions cannot directly read or write these segment registers.

These 32 RISC general-purpose registers may be merged with the 8 CISC general-purpose registers and the 6 CISC segment registers. Table 7 shows how these registers are used for RISC. CISC, and emulation mode.

TABLE 7

Shared GPR's

| RISC Mode | CISC Mode | Emulation Mode |
|---|---|---|
| GPR 0 | EAX GPR | EAX GPR |
| GPR 1 | ECX GPR | ECX GPR |
| GPR 2 | EDX GPR | EDX GPR |
| GPR 3 | EBX GPR | EBX GPR |
| GPR 4 | ESP GPR | ESP GPR |
| GPR 5 | EBP GPR | EBP GPR |
| GPR 6 | ESI GPR | ESI GPR |
| GPR 7 | EDI GPR | EDI GPR |
| GPR 8 | ES Seg Base | ES Seg Base |
| GPR 9 | CS Seg Base | CS Seg Base |
| GPR 10 | SS Seg Base | SS Seg Base |
| GPR 11 | DS Seg Base | DS Seg Base |
| GPR 12 | FS Seg Base | FS Seg Base |
| GPR 13 | GS Seg Base | GS Seg Base |
| GPR 14 | N/A | Emulation Base Address |
| GPR 15 | N/A | 0 Base Address |
| GPR 16 | N/A | GPR 16 |
| GPR 17 | N/A | GPR 17 |
| GPR 18 | N/A | GPR 18 |
| GPR 19 | N/A | GPR 19 |
| GPR 20 | N/A | GPR 20 |
| GPR 21 | N/A | GPR 21 |
| GPR 22 | N/A | GPR 22 |
| GPR 23 | N/A | GPR 23 |
| GPR 24 | N/A | GPR 24 |
| GPR 25 | N/A | GPR 25 |
| GPR 26 | N/A | GPR 26 |
| GPR 27 | N/A | GPR 27 |
| GPR 28 | N/A | GPR 28 |
| GPR 29 | N/A | GPR 29 |
| GPR 30 | N/A | Emulation Assist Address |
| GPR 31 | N/A | Emulation Assist Data |

Table 7 shows that in RISC mode, the 32 general-purpose registers are accessible as true general-purpose registers. Any of the 32 registers may be read or written by RISC programs. In CISC mode, there are only 8 general-purpose registers, EAX through EDI, which share the same physical registers with the RISC GPRs 0 to 7. A CISC program may load one of its GPR's, such as EAX, with a data value, then switch to RISC mode, allowing the RISC program to read that value the CISC program placed in EAX merely by reading the RISC GPR 0. Since the RISC architecture defines GPR 0 as a regular GPR, many instructions can access this register without an explicit load from memory or register-to-register transfer. For example, a RISC add instruction could specify the value in GPR 0 that was loaded by the CISC program merely by identifying GPR 0 in one of the source fields in the RISC ADD instruction word. The result of the ADD may be written back to GPR 0 or any other GPR. Thus no explicit transfer is needed to access the CISC data by the RISC program.

The 6 CISC segment base address registers, ES Base to GS Base, may be implicitly read by the CISC program when generating an address. A RISC program may read or write these registers merely by specifing the corresponding GPR. If the CISC program required emulation code to load segment register FS Base with a base address, then the RISC emulation program would merely have to identify GPR 12 in a RISC instruction to read or write this base address.

CISC programs, however, cannot freely access any RISC GPR except GPR 0 to 7. CISC programs may access GPR 8 to 13 in a restricted way, since these registers correspond to the CISC segment registers ES Base to GS Base. The CISC program may use a special segment override in the CISC instruction word to access one of these segment base registers when calculating an address. The CISC architecture imposes limitations on accessing these segment registers, making them useful for transferring address information between the RISC and CISC programs, but not useful for transferring data. The CISC program can only implicitly access these segment registers for address generation.

CISC mode programs have no access to RISC GPR 14 to 31, since there is no corresponding CISC register. However, emulation mode can access all 31 RISC registers, including the first 8 registers, which are the CISC GPR's, and the 6 CISC segment base registers. However, emulation mode can freely access the CISC segment base registers. Emulation mode executes RISC instructions, so the mechanism to transfer data and address information between CISC and emulation modes is similar to transfers between CISC and RISC modes as described above. The RISC instructions in emulation mode can implicitly access a CISC register by identifying the corresponding RISC GPR as a source in the RISC instruction word.

Emulation mode differs slightly from RISC mode. Normal RISC address checking and page fault handling is performed for accesses to most registers. However, when any of the 6 CISC segment registers, or GPR 14 or 15, are used to generate an address, the CPU uses x86-type address checking and x86 page fault handling, rather than the normal RISC address checking and page faulting routines.

GPR 14 and 15 are used in emulation mode as special emulation-mode segment base address registers. When emulation code generates an address using GPR 15 as one of the operands, no segment validity checking is performed at all, neither RISC nor x86 segment validity checking. Using GPR 15 allows for emulation code to generate an address without any segment checking. Using GPR 14 causes the CPU to use one of the 6 CISC segment registers to form the address, and for checking segment validity. When emulation mode is entered, a 3-bit register is loaded with a pointer to one of the 6 CISC segment base registers. The pointer value loaded is the segment used by the CISC instruction being emulated. This is normally the data segment register DS, or code segment register CS, but a segment over-ride prefix appended onto the CISC instruction could indicate that one of the other segment base registers be used. Thus using GPR 14 allows the emulation code to generate an address using whichever CISC segment register would have been used by the CISC instruction. This is a very powerful feature for emulation, saving dozens of instructions in the emulation routine to examine and decode the CISC instruction word to determine which segment register should be used.

Both registers GPR 14 and 15 are preferably loaded with the value zero so that they do not modify the address being generated. Thus using these registers in emulation mode alters the address checking being used. Emulation mode, although using RISC instructions, can have CISC address checking for certain addresses generated with the CISC segment base registers and the two emulation base registers GPR 14 and 15.

Some of the RISC GPR's may be used by emulation mode for particular purposes. For example, GPR's 14, 15, 30, and 31 may be used by emulation routines for address generation within emulation mode, and for various assist functions.

If RISC mode and emulation mode are to be both used at the same time on a system, then the RISC program should not overwrite the four special emulation mode registers, or the CPU hardware needs to provide two sets of registers for GPR 14, 15, 30, and 31, one set exclusively for RISC mode, with a second set exclusively for emulation mode. RISC-mode programs must also not overwrite GPR's 0–13, which are used for CISC mode architectural registers. Because general RISC user programs will write these registers, and may not have a need for transferring data to a CISC program, a process or task switch from a CISC user program to a general RISC user program would be handled as a normal task switch, with all registers being saved to a stack before the switch so that the values in the GPR's will not be overwritten and lost.

The code segment base address is available in two separate registers: GPR 9 holds the CISC code segment base (CS Base) while the RISC count CTR register also holds this same code segment base. This is beneficial for modern pipelined and superscalar processors because the CTR/CS register can provide the branching unit with the code segment base address, while the GPR array also can provide the code segment base address to the execution unit. Thus the code segment base address may be provided from two separate registers to two separate units within the processor. Since these units are often separated, having the separate registers can save the delay in transferring the code segment from the GPR's to the branching unit. As the code segment base address is frequently used in address calculations, having it in two separate locations is useful, effectively doubling the available bandwidth for supplying this base address.

Merging the GPR's together with the CISC GPR and segment registers provides a very efficient and clean way of transferring address and data between CISC and RISC programs and emulation programs. Normal architectural features are used to access and transfer data. Data can be accessed explicitly by specifying the corresponding GPR as the source in the instruction word.

Shared Register Architecture

Figure 4:
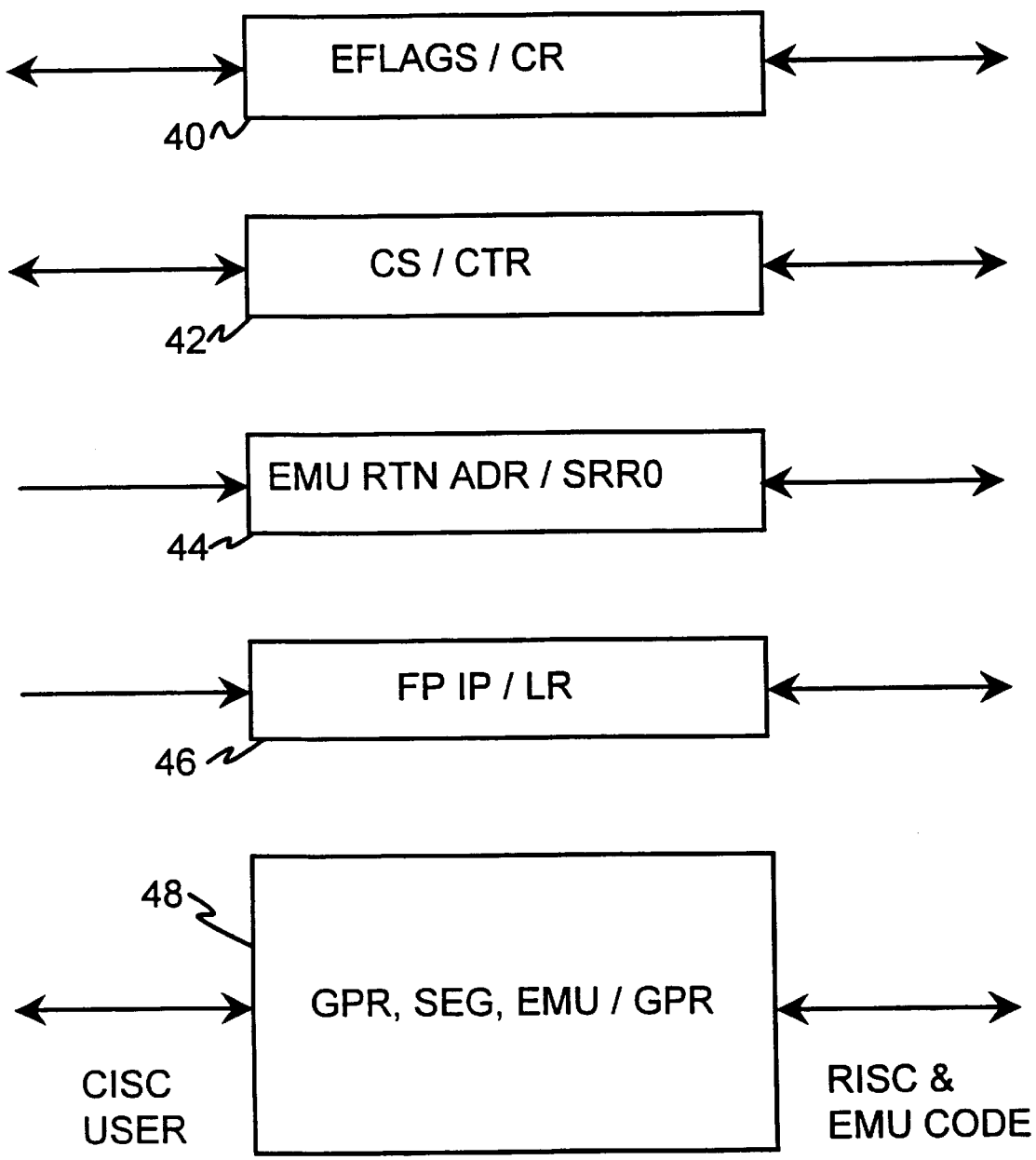
FIG. 4 shows shared registers in a dual-instruction-set CPU.

FIG. 4 is a diagram of the shared registers in the dual-instruction set processor. The CISC EFLAGS register and the RISC CR register are combined into a single 32-bit CR/EFLAGS register 40 that can be accessed by CISC user programs and RISC user programs and emulation code. The CISC code segment base address register and the RISC count CTR register are merged to a single CS/CTR register 42, also accessible by CISC user programs and RISC user programs and emulation code. The RISC system save/restore (SRR0) register, which normally holds the address to return to after an interrupt has been processed, also holds the return address when emulation code was called. Thus SRR0 can hold a RISC address or a CISC address. The RISC or CISC user can indirectly load SRR0 register 44 by causing emulation code to be entered, but cannot directly access SRR0 register 44. However, RISC supervisor code and emulation code has full access to SRR0 register 44.

The RISC link register, which is used to hold a branch address, is combined with a CISC register that holds the instruction address of the last floating point instruction. This merged FP-IP/LR register 46 is also indirectly accessible by CISC programs because they cannot directly read or write it, but can only load it by executing a floating point instruction. RISC and emulation programs can freely access this merged FP-IP/LR register 46. The 32 general-purpose registers from RISC are merged with the 8 GPR's and 6 segment base registers from the CISC architecture into merged GPR's 48. Four of the RISC GPR's are used by emulation code for sp(ecial uses, although emulation code can access all RISC and CISC registers.

Alternate Embodiments

This improvement relates to a central processing unit (CPU) for a dual-instruction set architecture. While the detailed description describes the invention in the context of the PowerPC™ reduced instruction set computer (RISC) and the x86 complex instruction set computer (CISC), it is contemplated that the invention applies to other instruction sets besides PowerPC™ and x86, and to more than two instruction sets, and to architectures besides RISC and CISC, without departing from the spirit of the invention. The exact number of bits in each register may likewise be varied by persons skilled in the art without departing from the spirit of the invention, although architecture compatibility may be lost.

The foregoing description of the embodiments of the invention his been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A shared register system for a dual-instruction-set processor, the shared register system comprising:

a shared register for storing information to be transferred between a first user program comprised of instructions from a first instruction set and a second user program comprised of instructions from a second instruction set, the first instruction set having a first encoding of operations to opcodes, the second instruction set having a second encoding of operations to opcodes, the first encoding of operations to opcodes being substantially independent from the second encoding of operations to opcodes;

a first decoder, coupled to the shared register, for accessing the shared register from the first instruction set, the first decoder writing information into the shared register responsive to a first subset of instructions from the first instruction set; and a second decoder, coupled to the shared register, for accessing the shared register from the second instruction set, the second decoder reading information from the shared register responsive to a second subset of instructions from the second instruction set, wherein the shared register is in a plurality of general-purpose registers in the dual-instruction-set processor, the source field and the destination field selecting any one register in the plurality of general-purpose registers, the one register selected being the shared register for transferring information between the first user program and the second user program; whereby information is transferred from the first user program to the second user program using the shared register.

2. The shared register system of claim 1 wherein the plurality of general-purpose registers comprise eight freely-accessible registers and six segment registers for holding segment base addresses.

3. The shared register system of claim 1 wherein the second instruction set is a RISC instruction set, and the first instruction set is a CISC instruction set.

4. The shared register system of claim 1 wherein the shared register comprises a first flags field for storing first flags implicitly set by arithmetic-logic-unit (ALU) operations encoded by opcodes in the first subset of instructions from the first instruction set, and wherein the shared register further comprises a second flags field for storing second flags implicitly set by arithmetic-logic-unit (ALU) operations encoded by opcodes in a third subset of instructions from the second instruction set, the second decoder for accessing the shared register from the second instruction set writing information to the shared register in response to instructions from the third subset of instructions from the second instruction set.

5. The shared register system of claim 1 wherein the first instruction set is a CISC instruction set, and the second instruction set is a non-CISC instruction set.

6. The shared register system of claim 5 wherein the first flags field in the shared register is implicitly read by first instructions having opcodes encoding conditional branch operations, and wherein the second flags field in the shared register is implicitly read by second instructions having opcodes encoding conditional branch operations.

7. The shared register system of claim 6 wherein the first flags include a zero flag indicating that an ALU operation had a zero-valued result and the second flags include a zero flag indicating that the ALU operation had a zero-valued result.

8. The shared register system of claim 7 wherein the second decoder for accessing the shared register from the second instruction set reads the first flags implicitly set by first instructions and reads the second flags implicitly set by second instructions, whereby the second program can read both the first flags implicitly set by ALU operations encoded by the first instruction set and the second flags implicitly set by ALU operations encoded by the second instruction set.

9. A central processing unit (CPU) for executing a first user program comprising first instructions from a first instruction set and for executing a second user program comprising second instructions from a second instruction set, the first instructions having a first field for specifying a destination register on the CPU, the second instructions having a second field for specifying a source register on the CPU, the CPU comprising:

a first instruction decoder, receiving the first instructions from the first instruction set, the first instruction decoder providing decoded first instructions;

a second instruction decoder, receiving the second instructions from the second instruction set, the second instruction decoder providing decoded second instructions.

an execution unit for executing first instructions and for executing second instructions, the execution unit receiving decoded first instructions from the first instruction decoder, the execution unit receiving decoded second instructions from the second instruction decoder; and a plurality of registers on the CPU, a selected register in the plurality of registers being written to by the execution unit when the execution unit recieves a decoded first instruction, the selected register specified by the first field for specifying a destination register on the CPU, the selected register in the plurality of registers being read from by the execution unit when the execution unit receives a decoded second instruction, the selected register specified by the second field for specifying a source register on the CPU, whereby data may be transferred from a first instruction to a second instruction via the selected register.

10. The central processing unit of clam 9 wherein the first instruction set has a first encoding of operations to opcodes, the second instruction set has a second encoding of operations to opcodes, the first encoding of operations to opcodes being substantially independent of the second encoding of operations to opcodes.

11. The shared register system of claim 9 wherein the second instruction set is a RISC instruction set, and the first instruction set is a CISC instruction set.

12. A method of transferring a data item from a CISC user program to a RISC user program, the CISC user program and the RISC user program executing on a processor, the processor having a first instruction decoder to decode a plurality of CISC instructions and a second instruction decoder to decode a plurality of RISC instructions, the processor having a pipeline for executing RISC instructions received from the second instruction decoder, the pipeline also for executing CISC instructions received from the first instruction decoder, the method comprising:

executing in the pipeline the CISC user program comprised of CISC instructions;

writing the data item to a general-purpose register in the processor, the general-purpose register specified by a destination field in a CISC instruction;

switching to execution of the RISC user program;

executing in the pipeline the RISC user program comprised of RISC instructions;

reading the data item from the general-purpose register in the processor, the general-purpose register specified by a source field in a RISC instruction.

13. A shared register system for a dual-instruction-set processor, the shared register system comprising:

a shared register for storing information to be transferred between a first user program comprised of instructions from a first instruction set and a second user program comprised of instructions from a second instruction set, the first instruction set having a first encoding of operations to opcodes, the second instruction set having a second encoding of operations to opcodes, the first encoding of operations to opcodes being substantially independent from the second encoding of operations to opcodes;

first decoder, coupled to the shared register, for accessing the shared register from the first instruction set, the first decoder writing information into the shared register responsive to a first subset of instructions from the first instruction set; and a second decoder, coupled to the shared register, for accessing the shared register from the second instruction set, the second decoder reading information from the shared register responsive to a second subset of instructions from the second instruction set, wherein the shared register is in a plurality of general-purpose registers in the dual-instruction-set processor, the source field and the destination field selecting any one register in the plurality of general-purpose registers, the one register selected being the shared register for transferring information between the first user program and the second user program; and whereby information is transferred from the first user program to the second user program using the shared register.

14. A shared register system for a dual-instruction-set processor, the shared register system comprising:

a shared register for storing information to be transferred between a first user program comprised of instructions from a first instruction set and a second user program comprised of instructions from a second instruction set, the first instruction set having a first encoding of operations to opcodes, the second instruction set having a second encoding of operations to opcodes, the first encoding of operations to opcodes being substantially independent from the second encoding of operations to opcodes;

a first decoder, coupled to the shared register, for accessing the shared register from the first instruction set, the first decoder writing information into the shared register responsive to a first subset of instructions from the first instruction set; and a second decoder, coupled to the shared register, for accessing the shared register from the second instruction set, the second decoder reading information from the shared register responsive to a second subset of instructions from the second instruction set, wherein the shared register comprises a first flags field for storing first flags implicitly set by arithmetic-logic-unit (ALU) operations encoded by opcodes in the first subset of instructions from the first instruction set, and wherein the shared register further comprises a second flags field for storing second flags implicitly set by arithmetic-logic-unit (ALU) operations encoded by opcodes in a third subset of instructions from the second instruction set, the second decoder for accessing the shared register from the second instruction set writing information to the shared register in response to instructions from the third subset of instructions from the second instruction set;

wherein the first instruction set is a RISC instruction set and the second instruction set is a CISC instruction set;

wherein the first flags include a zero flag indicating that an ALU operation had a zero-valued result and the second flags include a zero flag indicating that the ALU operation had a zero-valued result;

wherein the second decoder for accessing the shared register from the second instruction set reads the first flags implicitly set by first instructions and reads the second flags implicitly set by second instructions, whereby the second user program can read both the first flags implicitly set by ALU operations encoded by the first instruction set and the second flags implicitly set by ALU operations encoded by the second instruction set; and whereby information is transferred from the first user program to the second user program using the shared register.

15. The shared register system of claim 14 wherein the operation is selected from the group consisting of an integer operation and a floating point operation.

16. The shared register system of claim 14 wherein the shared register is selected from the group consisting of a status register and a flags register.

17. The shared register system of claim 14 wherein the information transferred is selected from the group consisting of overflow status information and carry status information.

18. A processor for directly transferring a result from one instruction set to another instruction set the processor executing instructions from two instructions sets, the processor comprising:

a plurality of data registers for storing operands and results;

a first instruction decoder for decoding a first instruction from a first instruction set, the first instruction decoder outputting a first decoded instruction indicating an operation specified by a first opcode in the first instruction, the first instruction decoder also outputting to the plurality of data registers a source field and a destination field from the first instruction;

a second instruction decoder for decoding a second instruction from a second instruction set, the second instruction decoder outputting a second decoded instruction indicating an operation specified by a second opcode in the second instruction, the second instruction decoder also outputting to the plurality of data registers a source field and a destination field from the second instruction;

wherein the first instruction set has a first encoding of operations to first opcodes while the second instruction set has a second encoding of operations to second opcodes, the first encoding being substantially independent of the second encoding;

a register selector, receiving the source and destination fields from the first instruction decoder and from the second instruction decoder, for selecting a source register and a destination register in the plurality of data registers;

an execution unit, receiving the first decoded instruction indicating the operation specified by the first instruction and receiving the second decoded instruction indicating the operation specified by the second instruction, for performing the operation specified on an operand contained in the source register, the execution unit writing a result of the operation specified to the desolation register in the plurality of data registers;

wherein when the first instruction is executed by the execution unit, the result of the first instruction is written to the destination register specified in the first instruction, and when the second instruction is executed by the execution unit the operand is retrieved from the source register specified in the second instruction;

a flags register containing flags indicating status of the result from the execution unit;

whereby the flags in the flags register are set by execution of first instruction and by execution of second instructions; and a branch resolving unit, coupled to the execution unit, for resolving the flags register when a first decoded instruction or a second decoded instruction specifies a conditional branch operation, the branch resolving unit outputting an indication of taken or not taken in response to the flags and the operation specified;

wherein the flags in the flags register are set by execution of the first instruction but read by the branch resolving unit to resolve a second decoded instruction when a second instruction follows a first instruction which last updated the flags, whereby a flag updated by the fist instruction determines an outcome of the second instruction which is a conditional branch, the first instruction and the second instruction being from independent instruction sets, and whereby the result from execution of first instruction is transferred to the execution unit executing the second instruction when the destination register specified in the first instruction is the same register as the source register specified in the second instruction.

19. The processor of claim 18 wherein the result transferred from execution of the first instruction to the second instruction is not copied to a memory external to the processor but is written directly to the destination register by the first instruction and read directly from the source register by the second instruction, the result existing solely in the source register.

20. The processor of claim 18 wherein the plurality of data registers comprises a portion of a bank of general-purpose registers (GPR's) defined by at least one of the instruction sets, the portion being defined by both instruction sets.

21. The processor of claim 18 wherein the flags comprise:
a first zero flag set when the result of execution of the first instruction has the value of zero; and
a first sign flag indicating the sign of the result of execution of the first instruction.

22. The processor of claim 21 wherein the flags further comprise:
a second zero flag set when the result of execution of the second instruction has the value of zero;
a second sign flag indicating the sign of the result of execution of the second instruction.

23. The processor of claim 21 wherein the flags are implicitly set upon execution of the first instruction, the first instruction containing no fields indicating that the flags be set but the first instruction explicitly containing the destination field specifying the destination register.

24. The processor of claim 23 wherein the first instruction set is a RISC instruction set and wherein the second instruction set is a CISC instruction set.

25. A processor for executing first instructions from a first instruction set and for executing second instructions from a second instruction set, the first instructions having a first field for specifying a destination register on the processor, the second instructions having a second field for specifying a source register on the processor, the processor comprising:

a first instruction decoder, receiving the first instructions from the first instruction set, the first instruction decoder providing decoded first instructions indicating operations encoded by opcodes within the first instructions being decoded;

a second instruction decoder, receiving the second instructions from the second instruction set, the second instruction decoder providing decoded second instructions indicating operations encoded by opcodes within the second instructions being decoded;

an execution unit for executing first instructions and for executing, second instructions, the execution unit receiving decoded first instructions from the first instruction decoder, the execution unit receiving decoded second instructions from the second instruction decoder, the execution unit performing the operations indicated by the decoded first instructions and the decoded second instructions; and a plurality of registers on the processor, a selected register in the plurality of registers being written to by the execution unit when the execution unit receives a decoded first instruction, the selected register specified by the first field for specifying a destination register on the processor, the selected register in the plurality of registers being read from by the execution unit when the execution unit receives a decoded second instruction, the selected register specified by the second field for specifying a source register on the processor;

wherein the first instruction contains an opcode specifying an instruction which writes a result to the destination register, while the second instruction contains an opcode specifying an instruction which reads an operand from the source register, wherein the source register of the second instruction and the destination register of the fist instruction are the same register;

wherein the first instruction set has a first encoding of operations to opcodes, the second instruction set has a second encoding of operations to opcodes, the first encoding of operations to opcodes being substantially independent from the second encoding of operations to opcodes;

wherein the second instruction set is a RISC instruction set and the first instruction set is a CISC instruction set;

whereby data is transferred from a first instruction to a second instruction via the selected register.

26. The processor of claim 25 wherein the plurality of registers comprise 32 registers, wherein only a subset of the 32 registers can be specified as the source register by the second field in the second instruction, while any of the 32 registers can be specified as the destination register by the first field in the first instruction.

* * * * *